(12) United States Patent
Stückl et al.

(10) Patent No.: US 9,162,770 B2
(45) Date of Patent: Oct. 20, 2015

(54) ELECTRIC DRIVE DEVICE FOR AN AIRCRAFT

(75) Inventors: Stefan Stückl, München (DE); Jan Van Toor, München (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 122 days.

(21) Appl. No.: 14/124,912

(22) PCT Filed: May 25, 2012

(86) PCT No.: PCT/DE2012/000544
§ 371 (c)(1),
(2), (4) Date: Jan. 31, 2014

(87) PCT Pub. No.: WO2012/171520
PCT Pub. Date: Dec. 20, 2012

(65) Prior Publication Data
US 2014/0179535 A1    Jun. 26, 2014

(30) Foreign Application Priority Data

Jun. 14, 2011 (DE) .......................... 10 2011 105 880

(51) Int. Cl.
*B64D 27/24* (2006.01)
*B64D 33/08* (2006.01)
(52) U.S. Cl.
CPC ................ *B64D 27/24* (2013.01); *B64D 33/08* (2013.01); *Y02T 50/64* (2013.01)
(58) Field of Classification Search
CPC ...................................................... B64D 27/24
USPC .......................................... 318/139, 34, 558
See application file for complete search history.

(56) References Cited

U.S. PATENT DOCUMENTS

| 6,568,633 | B2 | 5/2003 | Dunn |
| 7,270,295 | B2 * | 9/2007 | Bennett ........................... 244/59 |
| 2006/0254255 | A1 | 11/2006 | Okai et al. |

FOREIGN PATENT DOCUMENTS

| CN | 201009757 | 1/2008 |
| DE | 3914426 A1 | 8/1990 |

(Continued)

OTHER PUBLICATIONS

International Preliminary Report on Patentability issued in PCT/DE2012/000544 on Dec. 17, 2013.

(Continued)

*Primary Examiner* — David S Luo
(74) *Attorney, Agent, or Firm* — Hoffmann & Baron, LLP

(57) ABSTRACT

The invention relates to a drive device for an aircraft, at least comprising a battery for storing electrical energy, an electric motor for driving a propeller, a conducting means for transferring the electrical energy from the battery to the electric motor, and a first control means for controlling the electric motor. The invention is characterized in that: the battery is a lithium-air battery; the electric motor is a high-temperature superconductor motor; at least one store is provided for a coolant and a cooling system which is connected to the store for cooling the high-temperature superconductor motor, the cooling system comprising a second control means for controlling the cooling system; a first means is provided for variably arranging the lithium-air battery and/or a second means is provided for variably arranging the store in the aircraft; and a third control means is provided for controlling the first and/or the second means.

18 Claims, 3 Drawing Sheets

(56) References Cited

FOREIGN PATENT DOCUMENTS

| DE | 4128362 A1 | 3/1992 |
|---|---|---|
| DE | 19600936 A1 | 8/1996 |
| DE | 102007017332 A1 | 10/2008 |
| WO | 2011/023396 A2 | 3/2011 |

OTHER PUBLICATIONS

Dilba, Denis, "Supraleiter im Flugzeug", Technology Review Sep. 7, 2007, heise online, http://www.heise.de/tr/artikel/Supraleiter-im-Flugzeug-280031.html.

* cited by examiner

ELECTRIC DRIVE DEVICE FOR AN AIRCRAFT

CROSS-REFERENCE TO RELATED APPLICATIONS

This application is a U.S. National Phase of International Application No. PCT/DE2012/000544 filed 25 May 2012, which claims benefit of German Patent Application No. 10 2011 105 880.3 filed 14 Jun. 2011, the contents of which are incorporated herein by reference in their entirety.

BACKGROUND

The invention relates to an electric drive device for an aircraft, comprising at least one battery for storing electrical energy, an electric motor for driving a propeller, a conductive means for transferring the electrical energy from the battery to the electric motor, and a first control means for controlling the electric motor. This invention is used for applications in the aircraft industry.

Generic drive devices for so-called "electric aircraft" are known in the prior art. Initial such applications of electric drives can be found in aircraft model making. One focus of electric drives for aircraft is the storage and/or generation of electrical propulsion energy aboard an aircraft. By corresponding further developments of the battery technology until today, in particular by increasing the specific energy density [Wh/kg] of batteries, recently electric drives for aircraft have also been realized which are suitable for passenger transportation, for example. In addition to supplying energy from batteries to the electric drive, additional technologies are typically employed for generating electrical energy aboard an aircraft. The use of fuel cells for generating energy on board is known through the German experimental unit Antares 20E, a single-seater power glider with a propeller driven by an electric motor. Additional success has recently been achieved by a solar aircraft of the Swiss SOLAR IMPULSE project, where a solar aircraft with a span of approximately 64 m and having a mass of approximately 1.6 tons was operated by a pilot throughout an entire night. The solar energy absorbed during the day, which was converted into electrical energy and stored in batteries, made this flight of approximately 26 flying hours possible.

SUMMARY

The object of the invention is to indicate an improved electric drive device that is suitable for the propulsion of larger aircraft for the transportation of passengers or freight.

The invention results from the features of the independent claims. Advantageous developments and designs are subject of the dependent claims. Additional features, possible applications and advantages of the invention result from the following description, as well as from the explanation of embodiments of the invention, which are represented in the Figures.

The object is solved by a drive device for an aircraft, comprising at least one battery for storing electrical energy, an electric motor for driving a propeller, a conductive means for transferring the electrical energy from the battery to the electric motor, and a first control means for controlling the electric motor. The drive device as claimed by the invention is moreover characterized in that the battery is a lithium-air battery; the electric motor is a high-temperature superconductor motor; that at least one reservoir for a coolant and a cooling system connected with the reservoir for cooling the high-temperature superconductor motor is provided, wherein the cooling system comprises a second control means for controlling the cooling system; a first means for the variable configuration of the lithium-air battery and/or a second means for the variable configuration of the reservoir in the aircraft is/are provided; and a third control means for controlling the first and/or the second means is provided, wherein the control of the first and/or the second means occurs such that the lithium air-battery and/or the reservoir in the aircraft are configured such that a mass increase of the lithium air-battery which results during the operation of the drive device and a mass decrease of the coolant (for example liquid nitrogen) in the reservoir that results during the operation of the drive device will not change a center of gravity position of the aircraft.

The lithium-air battery and its mode of action are known in the prior art. The lithium-air battery is characterized by a particularly large energy density of theoretically up to above 5,000 Wh/kg, with a no-load voltage of 2.91 V. During the discharge of the lithium air-battery, that is during withdrawal of electrical energy, the lithium Li of the anode is oxidized to lithium oxide $Li_2O$ or lithium peroxide $Li_2O_2$. This produces an increase in mass and/or weight of the battery which, with large batteries as required in the present case, can amount to several 100 kg. This change in weight produces a shift in the center of gravity of the aircraft during the operation.

The drive device as claimed by the invention comprises a reservoir with coolant, for cooling at least the high-temperature superconductor motor, and preferably also for the coolant far enough so that superconductivity occurs. Such type of motors permit a further reduction in energy losses during the conversion of electrical energy from the lithium-air battery into mechanical energy.

Preferably, the coolant in the reservoir is liquid nitrogen. Liquid hydrogen or liquid helium are possible alternatives. The conductive means is preferably a copper oxide-based high-temperature superconductor. For cooling the high-temperature superconductor motor and/or the conductive means, the coolant is brought into thermally conductive contact with the high temperature superconductor motor and/or the conductive means. The coolant which is present by the operation of the cooling system is ultimately discharged into the ambient atmosphere, so that the coolant level in the reservoir decreases during the operation. The discharge of nitrogen into the atmosphere is harmless in terms of environmental concerns. The loss of coolant in the reservoir results in a loss of mass and/or weight of the coolant contained in the reservoir.

To compensate for the increase in mass and/or weight in the lithium-air battery on the one hand, and on the other the decrease in mass and/or weight of the coolant in the reservoir in relation to the shifts of the center of gravity of the aircraft and/or the resulting moments therefrom created during operation, the lithium-air battery and/or the reservoir with the coolant can be variably arranged in the aircraft. In this context, the lithium-air battery and/or the reservoir are preferably arranged in the fuselage of the aircraft. The lithium-air battery is furthermore preferably arranged in a housing which has the outside dimensions of a standard airfreight container, in particular LD3, LD6. Therefore, existing standard freight spaces can be used for accommodating the lithium-air battery. At this point it should also be noted that the present term "lithium-air battery" can in particular also include multiple lithium-air batteries that are connected together.

The first means exists for the variable configuration of the lithium-air battery, i.e. in particular for shifting it along a longitudinal axis of the aircraft. Said first means includes a drive (for example a linear drive) and a corresponding mechanism. In the same manner, the second means exists for the variable configuration of the coolant reservoir, i.e. in particular for shifting it along the longitudinal axis of the aircraft. According to the invention, the configuration of the lithium-air battery and/or of the reservoir is controlled by the third control means such that a center of gravity position of the aircraft will not change. For this purpose, in a preferred embodiment, the lithium-air battery can be simply variably arranged in the aircraft.

A preferred development of the drive device as claimed by the invention is characterized in that the lithium-air battery comprises a pressure sealed housing which is supplied with outside air by means of a separate air supply, which is in particular independent of the air supply of a passenger cabin of the aircraft. This independent air supply can allow the pressure sealed battery housing to be pressurized, depending on the flight elevation. By the separation of the air supply, the air supply can be optimally adjusted to the lithium-air battery requirements.

A further preferred development of the drive device as claimed by the invention is characterized in that in addition to the high-temperature superconductor motor, the conductive means is also superconductive, and that the cooling system is designed and set up for cooling the conductive means. Due to the superconductive conductive means, it is possible to transfer the electrical energy almost free of losses from the lithium-air battery to the high-temperature superconductive electric motor.

In a further preferred development, the cooling system is designed and set up such that during normal operation, the coolant is supplied from the reservoir to the subsequently named components in the following sequence; initially to the conductive means, thereafter to the electric motor and then to further systems of the aircraft, in particularly to the first control means, to the second control means, to the third control means and/or avionic systems, before the coolant flows out into an environment by means of an outlet. As a result, the coolant is optimally used for cooling of system components of the aircraft, before it is discharged into the ambient atmosphere.

A further preferred development of the drive device as claimed by the invention is characterized in that the second control means and the cooling system are designed and set up such, that an order of priority can be determined depending on a propulsive power called up from the drive device as claimed by the invention, with which cooling of the individual components is to be done, and the coolant be supplied to the individual components in accordance with the order of priority. In this configuration, for example during a starting phase, in which a maximum propulsive power from the drive device is initiated, the cooling of the high-temperature superconductor motor can occur primarily and of the conductive means with second priority, while the cooling of the further system components will occur only in a reduced form and not at all.

A particularly preferred development of the drive device as claimed by the invention is characterized in that solar cells are provided for charging the battery and/or for providing further electrical energy, at least one fuel cell and/or one combustion engine with an electric generator is/are provided.

The drive device can in particular comprise two electric motors, each of which drive one propeller, the propeller axes of which are supported concentrically.

The invention moreover comprises an aircraft with a drive device described previously.

SUMMARY OF THE DRAWINGS

Further advantages, features and particulars result from the following description, which describes particulars of embodiments with reference to the drawings. Identical, similar and/or parts which have the same function, are provided with the same reference symbols, which show.

DETAILED DESCRIPTION

Figure 1:
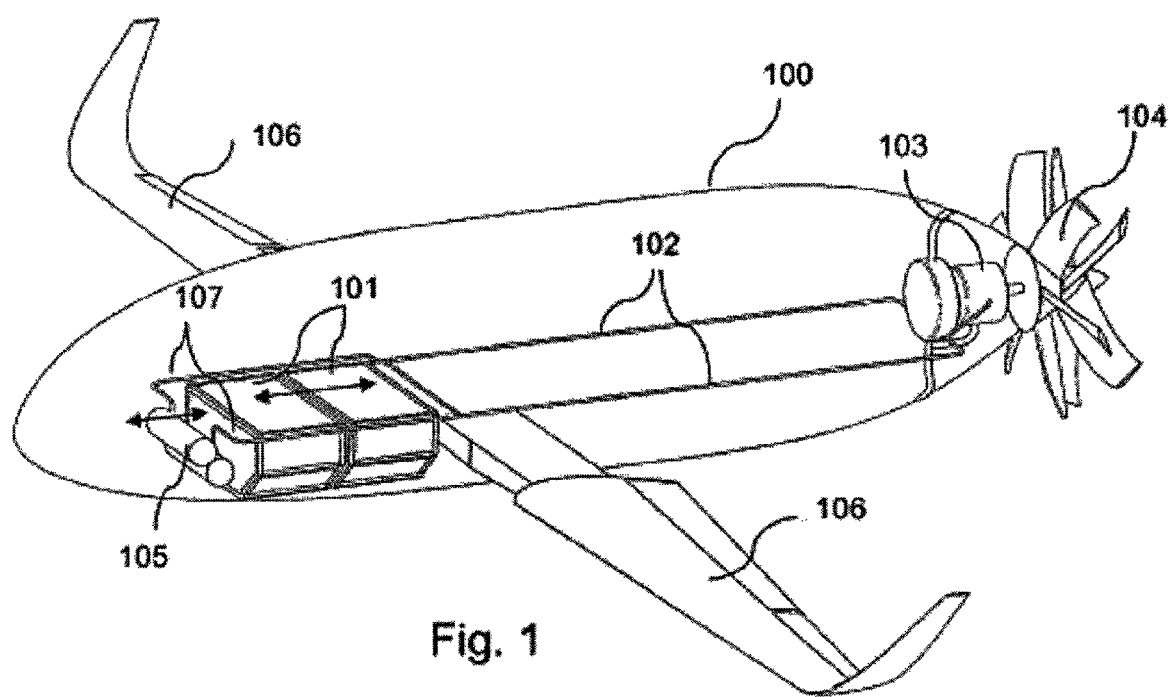
FIG. 1 is a schematic representation of a drive device integrated in an aircraft, as claimed by the invention.

FIG. 1 shows a schematic representation of a drive device as claimed by the invention integrated in an aircraft 100 with conventional lifting surfaces 106 (wings). The aircraft 100 would be designed for transporting a useful load of 6,600 kg (approximately 70 passengers) over a distance of 500 nautical miles [NM] at an airspeed of 500 km/h. A lift-to-drag-ratio of 24 would apply for the aircraft 100. This flight mission requires 14,700 MJ (=4,100 kWh) of energy. 4,000 kW are needed for a short period for starting the aircraft 100. To carry out such flight mission with a drive device as claimed by the invention, a lithium-air battery 101 with a mass of 4,570 kg and the battery volume of approximately 6.8 $m^3$ is provided. The lithium-air battery 101 has an energy density of 1000 Wh/kh for this purpose. The lithium air-battery 101 consist presently of two interconnected lithium-air batteries 101, each of which are accommodated in a standard LD3 airfreight container. The containers are arranged so that they can be shifted along the longitudinal axis of the aircraft 100 (indicated by the arrow above the batteries 101). The aircraft 100 moreover comprises an electric motor 103 for the propulsion of a double propeller 104 on the tail of the aircraft 100 as well as a superconductive conductive means 102 for transferring electrical energy from the lithium-air batteries 101 to the electric motor 103. The conductive means 102 is surrounded by coolant lines 107 for cooling the conductive means for maintaining the superconductivity. The coolant is stocked in a reservoir 105 that is also arranged so that it can be shifted along the longitudinal axis of the aircraft. The electric motor 103 is presently designed as a high-temperature superconductor motor and is also cooled by the coolant.

Figure 2:
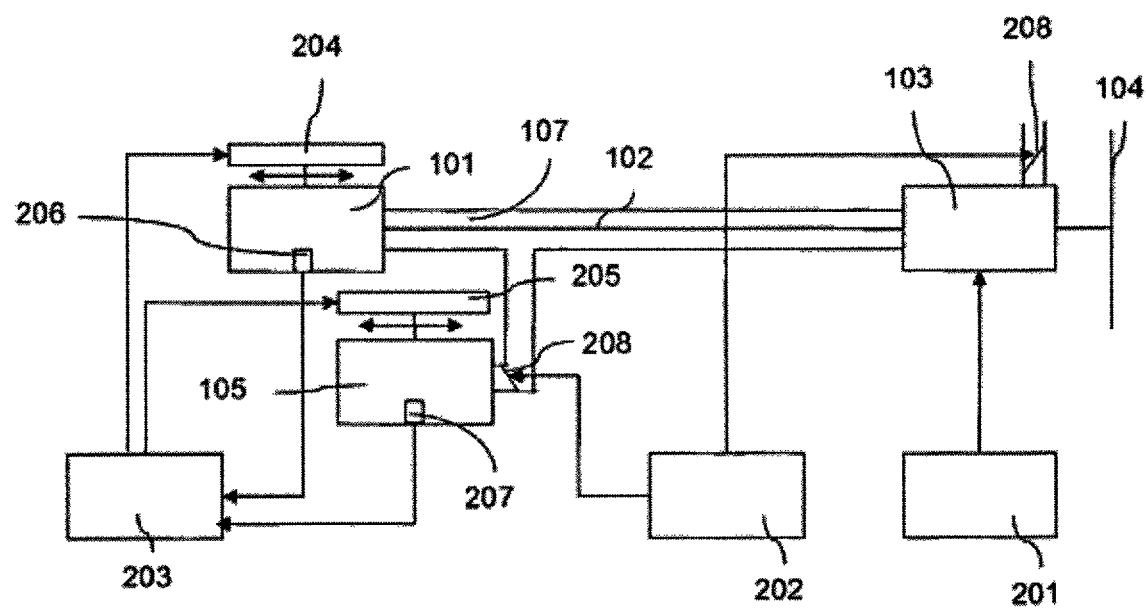
FIG. 2 is a schematic representation for explaining the interaction of components of the device as claimed by the invention.

FIG. 2 illustrates a schematic representation for explaining the interaction of components of the drive device as claimed by the invention for the aircraft 100 shown in FIG. 1. The drive device comprises a battery 101 for storage of electrical energy, a high-temperature superconductor motor 103 for the propulsion of a propeller 104, a conductive means 102 for transferring the electrical energy from the battery 101 to the high-temperature superconductor motor 103, and a first control means 201 for controlling the electric motor 103. The drive device as claimed by the invention is moreover characterized in that the battery 101 is a lithium-air battery; that the conductive means 102 is superconductive; that at least one reservoir 105 for a coolant and a cooling system connected with the reservoir for cooling the high-temperature superconductor motor 103 and the conductive means 102 is provided, wherein the cooling system comprises a second control means 202 for controlling the cooling system; a first means 204 for the variable configuration of the lithium-air battery 101 and a second means 205 for the variable configuration of the reservoir 105 in the aircraft 100 are provided; and a third control means 203 for controlling the first 204 and/or the second 205 means is provided, wherein the control of the first 204 and the second 205 means occurs such that the lithium air-battery 101 and the reservoir 105 in the aircraft 100 are configured along the longitudinal axis of the aircraft such that a mass increase of the lithium air-battery 101 which results during an operation of the drive device and a mass decrease of the liquid nitrogen in the reservoir 105 that results during the operation of the drive device will not change a center of gravity position of the aircraft 100. The cooling system comprises a pipe system through which coolant flows. The pipe system initially directs the coolant from the reservoir 105 to the conductive means 102. There it flows for cooling the cooling lines 107 surrounding the coolant to the high-temperature superconductor motor 103, where it is used for cooling same. After flowing through the high-temperature superconductor motor 103, it is still used for the cooling of a power electronics 305, prior to being discharged into the ambient atmosphere. The control of the cooling system is done by the second means, which presently controls at least two valves 208.

The third control means 203 is presently connected with two sensors 206 and 207. The sensor 206 serves for determining the actual weight of the lithium air-battery. The sensor 207 serves for determining the actual weight of the coolant contained in the reservoir. The information from both is used by the third control means 203, in order to shift the lithium-air batteries 101 and the reservoir 105 in the aircraft 100 along the longitudinal axis of the aircraft 100 by means of the first 204 and the second means 205 such that an increase in mass of the lithium batteries 101 resulting during an operation of the drive device and a mass decrease of the liquid nitrogen in the reservoir 105 resulting during an operation of the drive device, does not change the center of gravity position of the aircraft 100.

Figure 3:
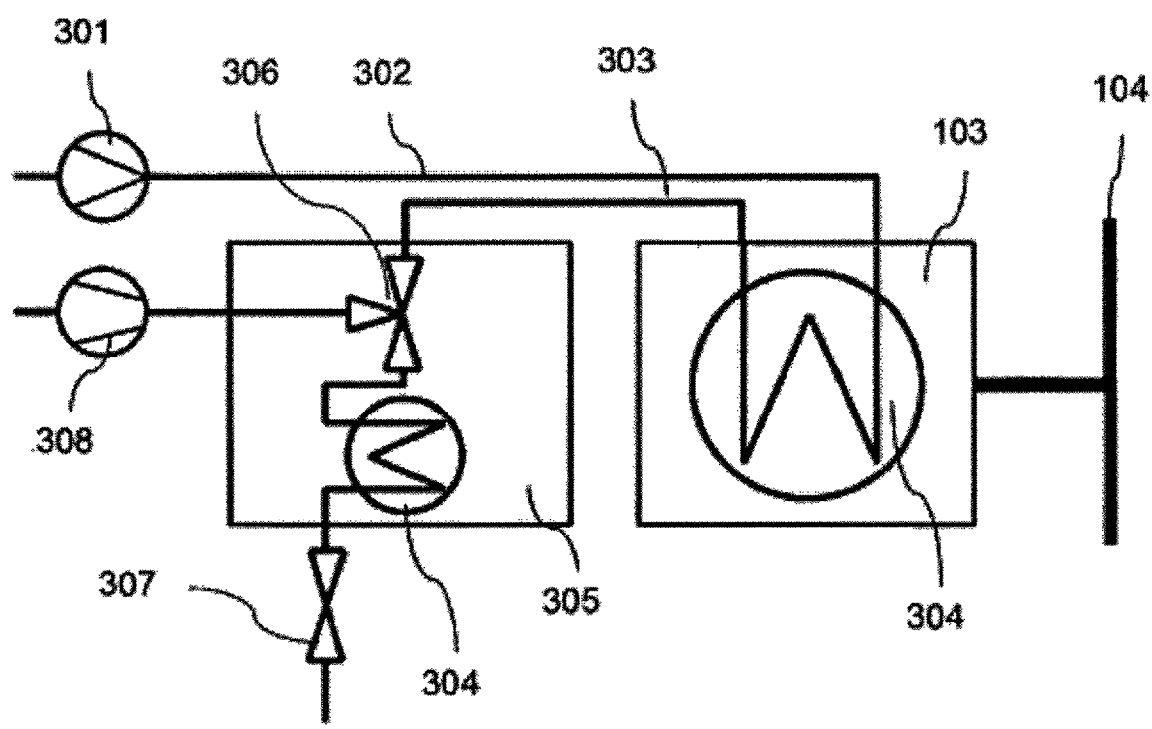
FIG. 3 is a schematic representation of the cooling of a superconductive electric motor and a non-superconductive control electronics.

FIG. 3 shows a schematic representation of the cooling of the high-temperature superconductor electric motor 103 and a non-superconductor control electronics 305. Liquid nitrogen is available in the reservoir 105 as coolant, which is supplied by means of the coolant lines 107 and the valves 301 following the cooling of the conductive means 102 to the high-temperature superconductor electric motor 103. For this purpose, the liquid nitrogen is supplied at approximately 80 Kelvin [K] from the reservoir 105 by means of a transfer pump (not shown) into the heat exchanger 304 of the high-temperature superconductor electric motor 103.

There, depending on the mass flow, a part of the nitrogen evaporates and in that context absorbs the dissipated heat by the evaporation cold (mechanical losses, installation losses) of the higher-temperature superconductor electric motor 103. The gaseous nitrogen, which is still cold (barely above 80 K) is mixed with ambient air by means of a mixing valve 306 in order to increase the cooling mass flow. Using a compressor 308, the ambient air is brought up to the pressure in the coolant system. The mixture from ambient air and nitrogen absorbs the dissipated heat from the control electronics 305 in a further heat exchangers 304, and is discharged with the valve 307 into the environment by means of a waste gas system. The valve 307 on the outlet of the coolant maintains the pressure within the cooling system. The ratio of the air/nitrogen mixture can be varied depending upon the cooling requirement and the outside temperature. For example, at an outside temperature of 30° C., effective cooling is possible with a high proportion of nitrogen during starting and landing. During air travel at high altitude at lower power and outside temperature, the proportion of nitrogen can be reduced to the necessary minimum for cooling of the superconductive electric motor 103

LIST OF REFERENCE SYMBOLS

- 100 Aircraft
- 101 Lithium air-battery
- 102 superconductive conductive means for transfer of the electrical energy from the battery to the electric motor
- 103 Electric motor, high-temperature super conductor motor
- 104 Propeller
- 105 Reservoir for coolant
- 106 Lifting surfaces (wings)
- 107 Coolant lines
- 201 first control means
- 202 second control means
- 203 third control means
- 204 first means for variably arranging the lithium air-battery
- 205 second means for variably arranging the reservoir
- 206 sensor for determining the actual weight of the lithium air-battery
- 207 sensor for determining the actual weight of the coolant contained in the reservoir
- 208 Valves
- 301 Valve
- 302 liquid coolant
- 303 gaseous coolant
- 304 Heat exchanger
- 305 Control electronics
- 306 Mixing valve
- 307 Outlet valve
- 308 Compressor

The invention claimed is:

1. A drive device for an aircraft, comprising at least a battery for storage of electrical energy, an electric motor for the propulsion of a propeller, a conductive means for transferring the electrical energy from the battery to the electric motor, and a first control means for controlling the electric motor, wherein the battery is a lithium-air battery, the electric motor is a high-temperature superconductor motor, that at least one reservoir for a coolant and a cooling system connected with the reservoir for cooling the high-temperature superconductor motor is provided, wherein the cooling system comprises a second control means for controlling the cooling system, a first means for the variable configuration of the lithium-air battery and/or a second means for the variable configuration of the reservoir in the aircraft is/are provided, and a third control means for controlling the first and/or the second means is provided, wherein the control of the first and/or the second means occurs such that the lithium air-battery and/or the reservoir in the aircraft are configured such that a mass increase of the lithium-air battery which results during an operation of the drive device and a mass decrease of the liquid nitrogen in the reservoir that results during an operation of the drive device will not change a center of gravity position of the aircraft.

2. The drive device according to claim 1, wherein only the lithium-air battery can be configured variable.

3. The drive device pursuant to claim 1, wherein the lithium-air battery comprises a pressure sealed housing, which is supplied with outside air by means of a separate air supply, which is in particular independent of the air supply of a passenger cabin of the aircraft.

4. The drive device according to claim 1, wherein the conductive means is superconductive, and that the cooling system is designed and set up for cooling the conductive means.

5. The drive device according to claim 1, wherein the cooling system is designed and set up such that during normal operation, the coolant is supplied from the reservoir to the subsequently named components in the following sequence, initially to the conductive means, thereafter to the electric motor and subsequently to further systems of the aircraft, in particular to the first control means, to the second control means, to the third control means and/or avionic systems, before the coolant flows out into an environment by means of an outlet.

6. The drive device according to claim 5, wherein the second control means and the cooling system are designed and set up such, that an order of priority can be determined depending on a propulsive power called up from the drive device, with which cooling of the individual components is to be done, and that the coolant is supplied to the individual components in accordance with the order of priority.

7. The drive device according to claim 1, wherein the coolant in the reservoir is liquid nitrogen.

8. The drive device according to claim 1, wherein two electric motors are provided, each of which drive one propeller, the propeller axes of which are supported concentrically.

9. The drive device according to claim 1, wherein the lithium-air battery is arranged in a housing, which comprises outside dimensions of a standard air freight container, in particular LD3, LD6.

10. An aircraft comprising:
   a drive device comprising at least a battery for storage of electrical energy, an electric motor for the propulsion of a propeller, a conductive means for transferring the electrical energy from the battery to the electric motor, and a first control means for controlling the electric motor, wherein
      the battery is a lithium-air battery, the electric motor is a high-temperature superconductor motor, that at least one reservoir for a coolant and a cooling system connected with the reservoir for cooling the high-temperature superconductor motor is provided, wherein the cooling system comprises a second control means for controlling the cooling system,
   a first means for the variable configuration of the lithium-air battery and/or a second means for the variable configuration of the reservoir in the aircraft is/are provided, and
   a third control means for controlling the first and/or the second means is provided, wherein the control of the first and/or the second means occurs such that the lithium air-battery and/or the reservoir in the aircraft are configured such that a mass increase of the lithium-air battery which results during an operation of the drive device and a mass decrease of the liquid nitrogen in the reservoir that results during an operation of the drive device will not change a center of gravity position of the aircraft.

11. The aircraft according to claim 10, wherein only the lithium-air battery can be configured variable.

12. The aircraft pursuant to claim 10, wherein the lithium-air battery comprises a pressure sealed housing, which is supplied with outside air by means of a separate air supply, which is in particular independent of the air supply of a passenger cabin of the aircraft.

13. The aircraft according to claim 10, wherein the conductive means is superconductive, and that the cooling system is designed and set up for cooling the conductive means.

14. The aircraft according to claim 10, wherein the cooling system is designed and set up such that during normal operation, the coolant is supplied from the reservoir to the subsequently named components in the following sequence, initially to the conductive means, thereafter to the electric motor and subsequently to further systems of the aircraft, in particular to the first control means, to the second control means, to the third control means and/or avionic systems, before the coolant flows out into an environment by means of an outlet.

15. The aircraft according to claim 14, wherein the second control means and the cooling system are designed and set up such, that an order of priority can be determined depending on a propulsive power called up from the drive device, with which cooling of the individual components is to be done, and that the coolant is supplied to the individual components in accordance with the order of priority.

16. The aircraft according to claim 10, wherein the coolant in the reservoir is liquid nitrogen.

17. The aircraft according to claim 10, wherein two electric motors are provided, each of which drive one propeller, the propeller axes of which are supported concentrically.

18. The aircraft according to claim 10, wherein the lithium-air battery is arranged in a housing, which comprises outside dimensions of a standard air freight container, in particular LD3, LD6.

* * * * *